US011673802B2

(12) United States Patent
Fong et al.

(10) Patent No.: US 11,673,802 B2
(45) Date of Patent: *Jun. 13, 2023

(54) HYDROGEN STORAGE ASSEMBLY

(71) Applicant: ATOMIC ENERGY OF CANADA LIMITED / ÉNERGIE ATOMIQUE DU CANADA LIMITÉE, Chalk River (CA)

(72) Inventors: Randy W. L. Fong, Pembroke (CA); James Patrick, Petawawa (CA); Michael Gale, Petawawa (CA)

(73) Assignee: Atomic Energy of Canada Limited / Énergie Atomique du Canada Limitèe, Chalk River (CA)

(*) Notice: Subject to any disclaimer, the term of this patent is extended or adjusted under 35 U.S.C. 154(b) by 273 days.

This patent is subject to a terminal disclaimer.

(21) Appl. No.: 17/083,806

(22) Filed: Oct. 29, 2020

(65) Prior Publication Data

US 2021/0047179 A1 Feb. 18, 2021

Related U.S. Application Data

(63) Continuation of application No. 16/060,084, filed as application No. PCT/CA2016/051432 on Dec. 7, 2016, now Pat. No. 10,850,979.

(Continued)

(51) Int. Cl.
*C01B 6/04* (2006.01)
*F17C 11/00* (2006.01)
*C01B 3/00* (2006.01)

(52) U.S. Cl.
CPC .......... *C01B 3/0042* (2013.01); *C01B 3/0005* (2013.01); *C01B 3/0084* (2013.01);
(Continued)

(58) Field of Classification Search
CPC .......... B01D 2259/4525; C01B 3/0042; C01B 3/0005; C01B 3/0084; C01B 6/04; F17C 11/005; Y02E 60/327
(Continued)

(56) References Cited

U.S. PATENT DOCUMENTS 2,890,319 A 6/1959 Watrous, Jr.
4,667,815 A 5/1987 Halene
(Continued)

FOREIGN PATENT DOCUMENTS

JP 61-045200 A 3/1986
JP 2000-1790 A 1/2000
(Continued)

OTHER PUBLICATIONS

Jain, et al., "Hydrogen storage in Mg: A most promising material". International Journal of Hydrogen Energy 35 (2010) 5133-5144.
(Continued)

*Primary Examiner* — Frank M Lawrence, Jr.
(74) *Attorney, Agent, or Firm* — Bereskin & Parr LLP/S.E.N.C.R.L., s.r.l.

(57) ABSTRACT

A hydrogen storage assembly includes at least one wafer formed of a substrate material that produces metal hydride when exposed to a hydrogen-rich carrier fluid. The wafer can be supported by a housing and arranged so that the hydrogen-rich carrier fluid can flow over a reaction surface of the wafer. At least one heating element can be arranged to transfer heat to the wafer to attain an operating temperature suitable for hydrogen charging on the reaction surface. A de-activation material may be provided on the reaction surface for inhibiting formation of surface oxide that impedes hydrogen absorption during charging and hydrogen desorption during discharging. The at least one wafer can include a plurality of monolithic plate wafers spaced apart
(Continued)

about a central axis of the assembly. The at least one wafer can include a plurality of monolithic disc wafers in at least one stacked arrangement.

22 Claims, 14 Drawing Sheets

Related U.S. Application Data

(60) Provisional application No. 62/264,051, filed on Dec. 7, 2015.

(52) U.S. Cl.
CPC .............. *C01B 6/04* (2013.01); *F17C 11/005* (2013.01); *Y02E 60/32* (2013.01)

(58) Field of Classification Search
USPC ...................... 96/108, 121; 95/116; 206/0.7; 423/248.1, 258.2; 429/515; 420/900
See application file for complete search history.

(56) References Cited

U.S. PATENT DOCUMENTS

| | | | |
|---|---|---|---|
| 4,928,496 A | 5/1990 | Wallace | |
| 6,318,453 B1 | 11/2001 | Ovshinsky et al. | |
| 6,742,650 B2 | 6/2004 | Yang et al. | |
| 6,997,242 B2 | 2/2006 | Fujita et al. | |
| 7,112,239 B2 | 9/2006 | Kimbara | |
| 7,875,107 B2 | 1/2011 | Mori et al. | |
| 8,651,268 B2 * | 2/2014 | Smith, Jr. ............. | H01M 8/065 423/658.2 |
| 8,778,063 B2 | 7/2014 | Mudawar | |
| 10,850,979 B2 * | 12/2020 | Fong ..................... | F17C 11/005 |
| 2004/0142203 A1 | 7/2004 | Woolley | |
| 2006/0237688 A1 | 10/2006 | Zimmermann | |
| 2010/0219087 A1 | 9/2010 | Fujita | |
| 2012/0201719 A1 | 8/2012 | Jehan et al. | |

FOREIGN PATENT DOCUMENTS

| | | |
|---|---|---|
| WO | 2013/190024 A2 | 12/2013 |
| WO | 2017/096474 A1 | 6/2017 |

OTHER PUBLICATIONS

Root, et ai., "Neutron diffraction for industry: optimized processing, failure analysis and regulations", Physica B, 241-243 (1998) 1181-1188.
Written Opinion of the International Search Authority dated Jun. 15, 2017 in respect of International Application No. PCT/CA2016/051432.
International Preliminary Report on Patentability dated Jun. 12, 2018 in respect of International Application No. PCT/CA2016/051432.
Extended European Search Report dated Mar. 26, 2019 in respect of European Application No. 16871863.3.
Non-Final Rejection dated Mar. 31, 2020 in respect of U.S. Appl. No. 16/060,084.

* cited by examiner

HYDROGEN STORAGE ASSEMBLY

CROSS-REFERENCE TO RELATED APPLICATIONS

This is a continuation of U.S. application Ser. No. 16/060,084 filed on Jun. 7, 2018, which is a national stage application of International Application No. PCT/CA2016/051432 filed on Dec. 7, 2016, which claims priority to U.S. Provisional Application No. 62/264,051 filed on Dec. 7, 2015, and the entire contents of each are hereby incorporated herein by reference.

FIELD

The present disclosure relates generally to hydrogen storage and metal hydride technology.

BACKGROUND

The following paragraphs are not an admission that anything discussed in them is prior art or part of the knowledge of persons skilled in the art.

The continuously growing demand in energy is causing the depletion of existing non-renewable fossil-based energy sources, the use of which raises serious environmental questions. To overcome this limited resource and abate greenhouse gas emissions that contribute to climate change, hydrogen energy technologies can provide the next generation energy source. The technology for hydrogen-based energy sources generally requires: (i) clean, renewable and economical processes to produce pure, high-quality hydrogen; (ii) developing high density storage media for hydrogen; and (iii) efficient infrastructures for delivery and supply chain of hydrogen-based energy technologies.

Metal hydrides, such as $MgH_2$, $NaAlH_4$, $LiAlH_4$, $LiH$, $LaNi_5H_6$, $TiFeH_2$ and palladium hydride, with varying degrees of efficiency, can be used as a storage medium for hydrogen. Metal hydrides can provide high packing density for hydrogen storage, and also can provide for storage in a relatively safe state compared to a high-pressure compressed gaseous form. Conversion of hydrogen (a chemical state) to a workable form of energy (e.g., electrical or mechanical) can be carried out by fuel cells, which exist presently to power cars, buses, electrical power generators, and the like. To date, there has been research focused on powder-based materials to develop metal-hydride systems that can store and release hydrogen in large quantities, efficiently and at low temperatures.

INTRODUCTION

The following is intended to introduce the reader to the detailed description that follows and not to define or limit the claimed subject matter.

In an aspect of the present disclosure, a hydrogen storage assembly is described. The hydrogen storage assembly can include: a housing; at least one wafer formed of a substrate material that produces metal hydride when exposed to a hydrogen-rich carrier fluid, the at least one wafer supported by the housing and arranged so that the hydrogen-rich carrier fluid can flow over a reaction surface of the at least one wafer; and at least one heating element arranged to transfer heat to the at least one wafer to attain an operating temperature suitable for hydrogen charging on the reaction surface.

The hydrogen storage assembly can include a de-activation material on the reaction surface for inhibiting formation of surface oxide that impedes hydrogen absorption during charging and hydrogen desorption during discharging. The substrate material can be a magnesium-based alloy, and the de-activation material can be a layer of nickel deposited on the reaction surface. The layer of nickel can have a thickness of between 0.5 and 1.5 μm, or about 1 μm. The layer of nickel can have a surface roughness of about 1 μm $R_a$ or less.

The at least one wafer can include a plurality of monolithic plate wafers spaced apart about a central axis of the assembly. Each of the plate wafers can be suspended generally radially between respective inner and outer supports of the housing. Opposing edges of each of the plate wafers can be received in an outwardly facing groove of the respective inner support and an inwardly facing groove of the respective outer support.

A central electrical busbar can be supported by the housing and positioned generally along the central axis, and the at least one heating element can consist of a plurality of electrical heating elements connected to and spaced about the central electrical busbar. Each of the electrical heating elements can be received in a respective sleeve and positioned between the reaction surfaces of adjacent ones of the plate wafers to heat the plate wafers by thermal radiation. Each of the electrical heating elements can be generally equidistant between the reaction surfaces of the adjacent ones of the plate wafers.

The housing can include at least one sidewall and at least one end cap, each having passages permitting flow of the hydrogen-rich carrier fluid over the plate wafers. The at least one sidewall and at least one end cap can define a top profile of the hydrogen storage assembly that is generally round or hexagonal in shape.

The at least one wafer can include a plurality of monolithic disc wafers in at least one stacked arrangement. The housing can include first and second end panels, and the disc wafers can be clamped between the end panels. The end panels can have passages permitting flow of the hydrogen-rich carrier fluid over the disc wafers. Each of the disc wafers can include a central hole, and the housing can include at least one stem that extends through the central holes of the disc wafers between the end panels. Disc wafers can be provided in first and second stacked arrangements, with disc wafers of the first stacked arrangement in contact with disc wafers of the second stacked arrangement so as to permit thermal conduction between the first and second stacked arrangements. The disc wafers of the first stacked arrangement can partially overlap the disc wafers of the second stacked arrangement in staggered relation. The at least one heating element can include an electrical heating element received in a central bore of the at least one stem to heat the disc wafers by thermal conduction. The housing can include a plurality of support rods connecting the end panels. The end panels can define a top profile of the hydrogen storage assembly that is generally square or rectangular in shape.

A hydrogen storage system can include a plurality of the hydrogen storage assemblies.

In an aspect of the present disclosure, a method of storing hydrogen is described. The method can include: providing a hydrogen storage assembly including a plurality of wafers formed of a substrate material that produces metal hydride when exposed to a hydrogen-rich carrier fluid, the plurality of wafers each including a reaction surface and a de-activation material on the reaction surface; transferring heat to the plurality of wafers to attain an operating temperature suitable for hydrogen charging on the reaction surfaces; and flowing the hydrogen-rich carrier fluid over the plurality of wafers so as to charge hydrogen on the reaction surfaces, thereby storing hydrogen in the hydrogen storage assembly.

The de-activation material on the reaction surfaces can inhibit formation of surface oxide that impedes hydrogen absorption during charging and hydrogen desorption during discharging. The substrate material can be a magnesium-based alloy, and the de-activation material can be a layer of nickel deposited on the reaction surfaces.

The method can include maintaining the operating temperature at about 250° C. or less. The step of flowing can include delivering the hydrogen-rich carrier fluid to the at least one wafer at an exposure pressure of about 10 Torr or less.

The method can include, after the step of flowing, flowing a second carrier fluid over the plurality of wafers to discharge hydrogen from the reaction surfaces, thereby releasing hydrogen from the hydrogen storage assembly.

The step of heating can include heating the plurality of wafers with at least one electrical heating element.

The step of heating can include heating the plurality of wafers by thermal radiation. The plurality of wafers can include a plurality of monolithic plate wafers, and the method can further include arranging the at least one electrical heating element between adjacent ones of the plate wafers.

The step of heating can include heating the plurality of wafers by thermal conduction. The plurality of wafers can include a plurality of monolithic disc wafers in at least one stacked arrangement, with each of the disc wafers including a central hole, and the method can further include arranging the at least one electrical heating element extending through the central holes of at least a portion of the disc wafers.

In an aspect of the present disclosure, a wafer for a hydrogen storage assembly is described. The wafer can be formed of a substrate material that produces metal hydride when exposed to a hydrogen-rich carrier fluid, and the wafer can include a reaction surface and a de-activation material on the reaction surface for inhibiting formation of surface oxide that impedes hydrogen absorption during charging and hydrogen desorption during discharging.

The substrate material can be a magnesium-based alloy, and the de-activation material can be a layer of nickel deposited on the reaction surface. The layer of nickel can have a thickness of between 0.5 and 1.5 μm, or about 1 μm. The layer of nickel can have a surface roughness of about 1 μm $R_a$ or less.

In an aspect of the present disclosure, a method of preparing a wafer for a hydrogen storage assembly is described. The method can include: providing a substrate material that produces metal hydride when exposed to a hydrogen-rich carrier fluid; and depositing a de-activation material on the substrate material to inhibit formation of surface oxide that can impede hydrogen absorption during charging and hydrogen desorption during discharging.

The substrate material can be a magnesium-based alloy, and the step of depositing can include electrodepositing a layer of nickel as the de-activation material. The step of depositing can include electrodepositing the layer of nickel to a thickness of between 0.5 and 1.5 μm, or about 1 μm. After the step of depositing, the layer of nickel can have a surface roughness of about 1 μm $R_a$ or less.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The present disclosure relates to the use of a wafer-based media that allows for relatively high density hydrogen storage and release capabilities, and at relatively low temperatures and pressures, generally without having to use powder metallurgy, glove-box technology and/or other expensive equipment for hydrogen charging and discharging.

Figure 1:
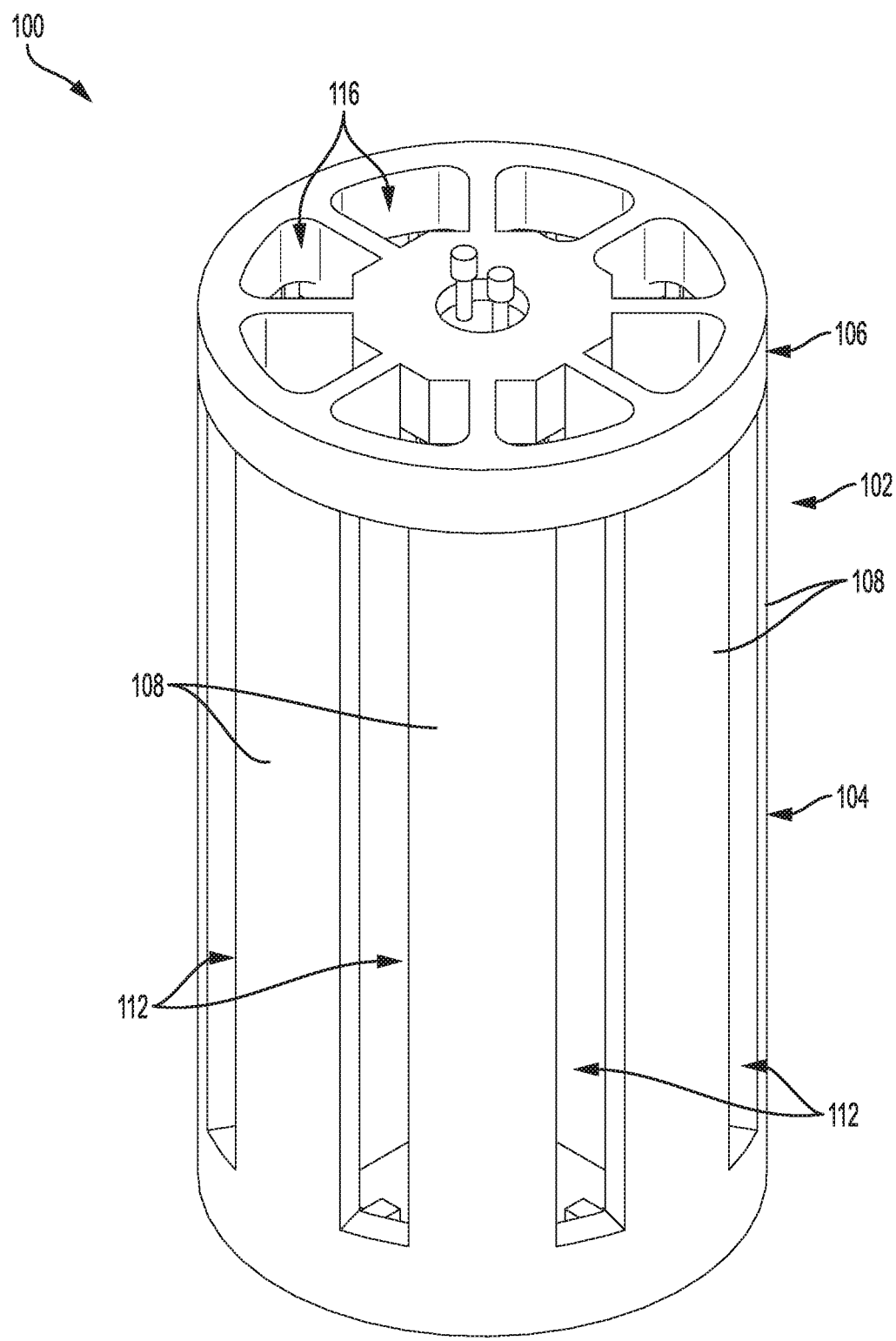
FIG. 1 is a perspective view of a hydrogen storage assembly in accordance with a first example.
Figure 2:
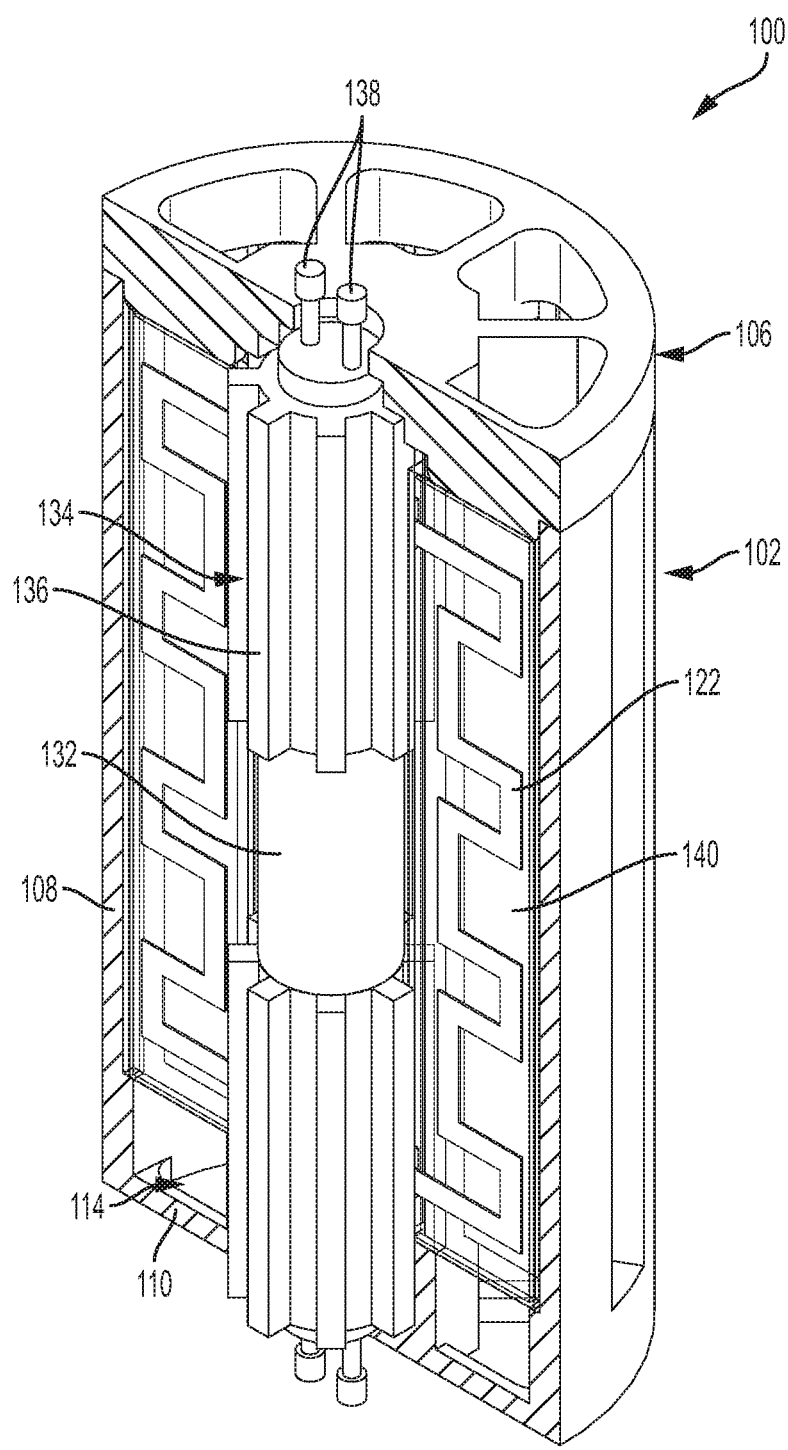
FIG. 2 is a partial cutaway perspective view of the hydrogen storage assembly of FIG. 1.

Referring to FIGS. 1 and 2, an example of a first hydrogen storage assembly is shown generally at reference numeral 100. In the example illustrated, the assembly 100 includes a housing 102 having a main body 104 and an upper end cap 106.

In the example illustrated, the main body 104 includes side walls 108 and a bottom wall 110. The main body 104 is shown to include passages 112 between the side walls 108 and passages 114 between the bottom wall 110, and the end cap 106 is shown to include passages 116. The passages 112, 114, 116 can permit a carrier fluid to flow in to and out from the assembly 100.

Figure 3:
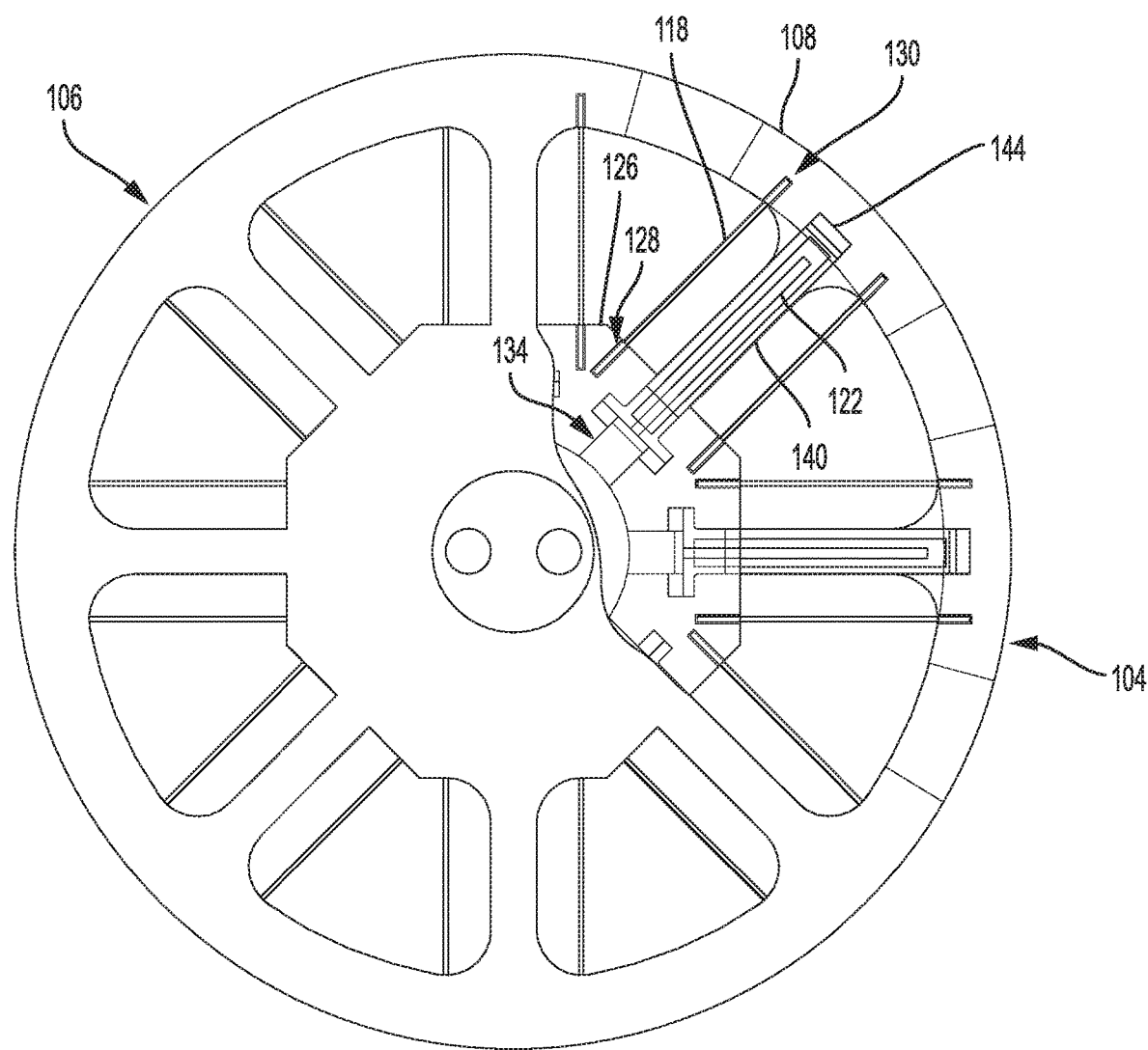
FIG. 3 is a partial cutaway top view of the hydrogen storage assembly of FIG. 1.
Figure 4:
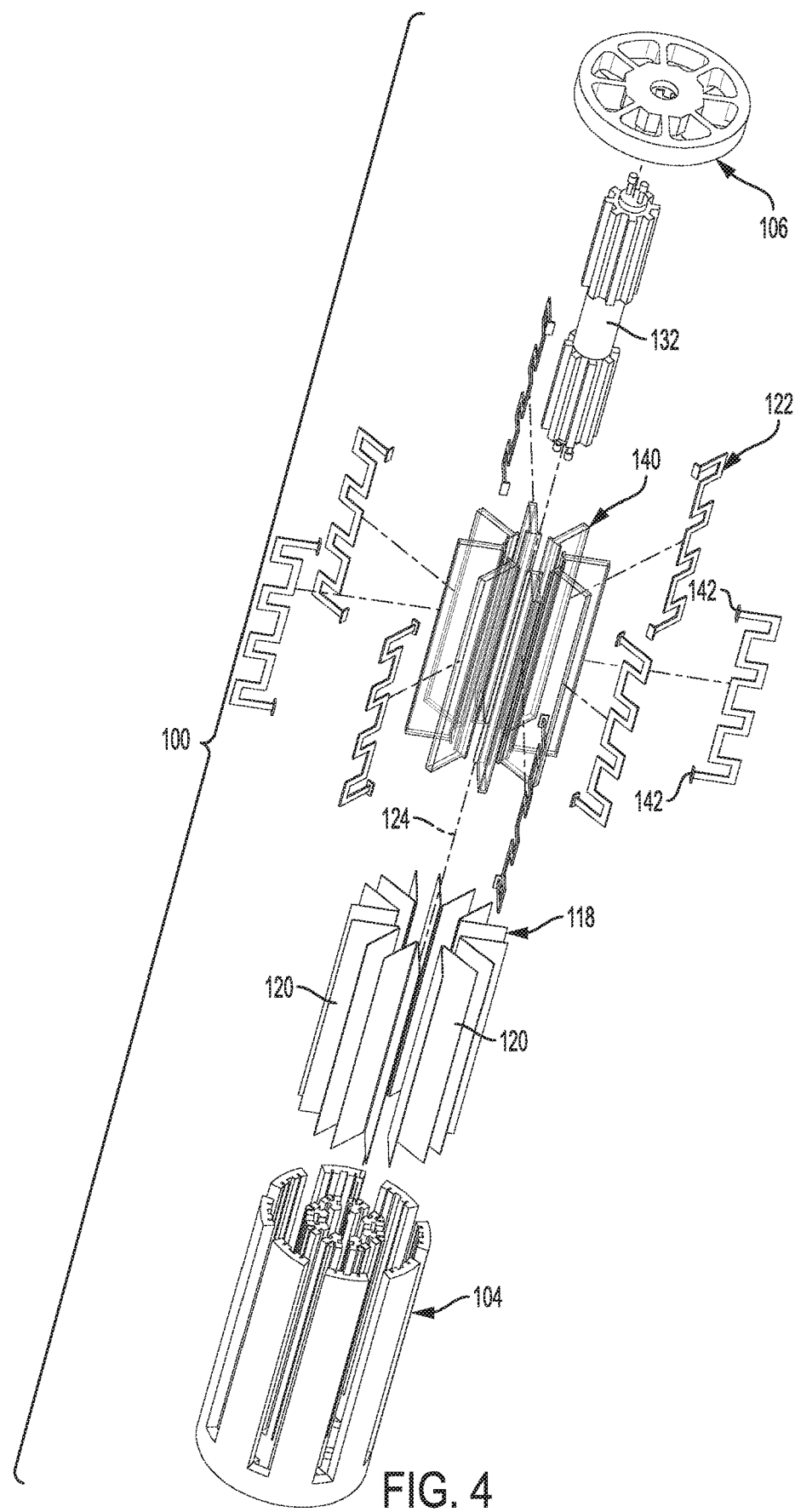
FIG. 4 is an exploded view of the hydrogen storage assembly of FIG. 1.

Referring to FIGS. 3 and 4, the assembly 100 includes wafers 118 that are formed of a substrate material that produces metal hydride when exposed to a hydrogen-rich carrier fluid. The wafers 118 are supported by the housing 102 and arranged so that the carrier fluid can flow over a reaction surface 120 of the wafers 118. In some examples, the metal hydride producing substrate material can be a magnesium-based alloy. Other metal hydride producing materials are possible, including, for example but not limited to, Zr—V, Ti—Fe and/or Ti—V alloys.

In some examples, the wafers 118 can include a de-activation material on the reaction surface 120. The de-activation material can inhibit formation of surface oxide that can impede hydrogen absorption during charging and hydrogen desorption during discharging, which can be referred to as a "poisoning" effect that can occur during repeated use of the wafers 118. In some examples, the de-activation material can be a layer of nickel deposited on the reaction surface 120. The layer of nickel can be electrodeposited and have a thickness of between 0.5 and 1.5 μm, or about 1 μm. The layer of nickel can have a smooth surface finish, e.g., a surface roughness of about 1 μm $R_a$ or less.

In the example illustrated, the assembly 100 includes heating elements 122 supported by the housing 102. The heating elements 122 are arranged to transfer heat to the wafers 118 to attain an operating temperature suitable for hydrogen charging on the reaction surfaces 120. In some examples, the operating temperature can be between about 200 and 250° C.

In the example illustrated, there are eight sets of two parallel wafers 118 in an octagonal array, held in the housing 102 that is shaped generally as a cylinder. As illustrated, each of the wafers 118 can be a flat plate that is thin-walled, monolithic or solid, rectangular in shape, and spaced apart about a central axis 124 of the assembly 100. In some examples, the wafers 118 can have dimensions of about 75×20×0.5 mm (length, width, thickness, respectively). Other configurations and dimensions are possible.

In the example illustrated, each of the wafers 118 is suspended generally radially about the central axis 124 between inner supports 126 and outer supports, which in the example illustrated are formed by the side walls 108. Each of the wafers 118 are shown having an inner edge received in an outwardly facing groove 128 of the respective inner support 126, and an outer edge received in an inwardly facing groove 130 of the respective side wall 108.

Referring again to FIG. 2, the assembly 100 includes a central electrical busbar 132 supported by the housing and positioned generally along the central axis 124 (FIG. 4). In the example illustrated, the busbar 132 is shown to include longitudinal ridges 134 defining outward faces 136. Electrical power can be provided to the busbar 132 via at least one set of terminals 138.

Referring to FIGS. 2, 3 and 4, the heating elements 122 are connected to and spaced about the busbar 132. In the example illustrated, there are a total of sixteen of the wafers 118 and eight of the heating elements 122. Each of the heating elements 122 is shown received in a respective sleeve 140 and positioned between the reaction surfaces 120 of adjacent ones of the wafers 118 to heat the wafers 118 by thermal radiation. The sleeves 140 can serve to keep the heating elements 122 from contacting the wafers 118. The sleeves 140 can be made of glass or another transparent or translucent material to allow transmission of radiant heat to the wafers 118. As shown, the reaction surfaces 120 of adjacent pairs of the wafers 118 can be generally parallel to one another, and the heating element 122 can be approximately equidistant to both of the reaction surfaces 120, which can promote uniform heating of the wafers 118.

In the example illustrated, each of the heating elements 122 can take the form of a flat ribbon with a serpentine shape for increasing its electrical resistance and increasing surface area for radiation to the reaction surfaces 120. In the example illustrated, each of the heating elements 122 includes connector mounts 142 at its ends, and the mounts 142 mate with the outward faces 136 of the busbar 132 to establish an electrical connection therewith.

In the example illustrated, the sleeves 140 have a T-shaped profile along the inward edges, which are received in a corresponding T-shaped slot in the respective inner support 126. In the example illustrated, outward edges of the sleeves 140 are received in an inwardly facing groove 144 on the side wall 108. In the example illustrated, in each of the side walls 108 there is a single groove 144 disposed intermediate of two of the grooves 130.

Figure 5:
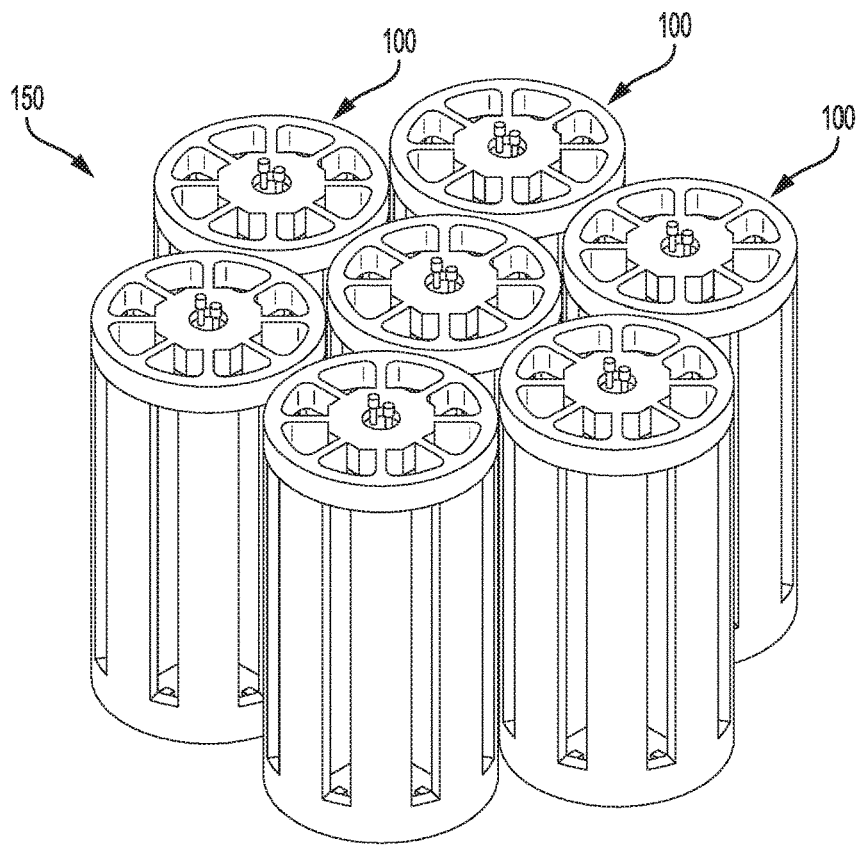
FIG. 5 is a perspective view of a plurality of the hydrogen storage assembly of FIG. 1 arranged in a system.
Figure 6:
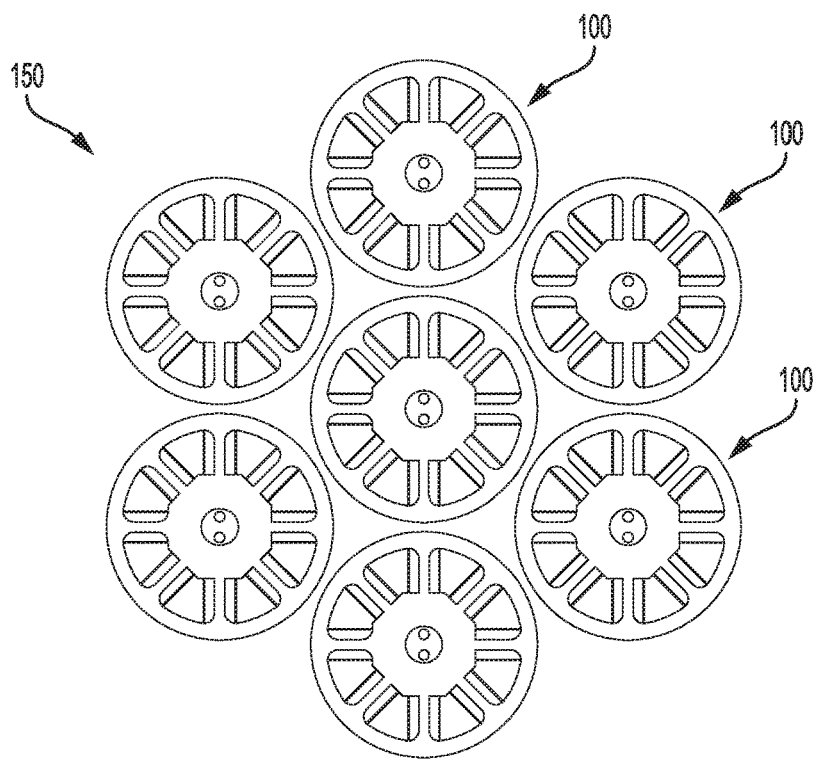
FIG. 6 is a top view of the storage system of FIG. 5.

Referring to FIGS. 5 and 6, several of the assembly 100 can be arranged together to create a hydrogen storage system 150. The housing of the assembly 100 defines at top profile that is generally round in shape, thereby permitting fluid flow around the assemblies in the system 150.

Figure 7:
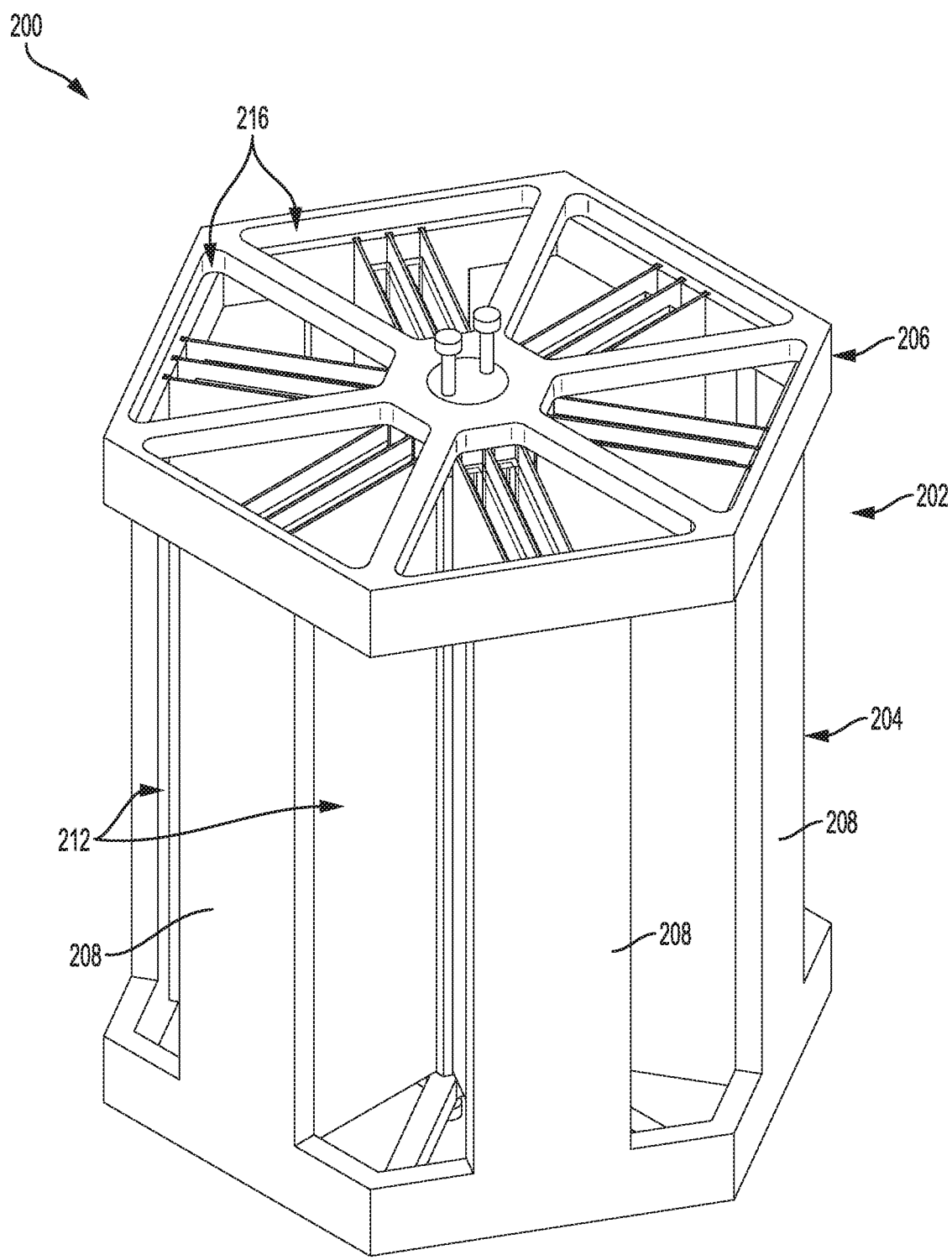
FIG. 7 is a perspective view of a hydrogen storage assembly in accordance with a second example.
Figure 8:
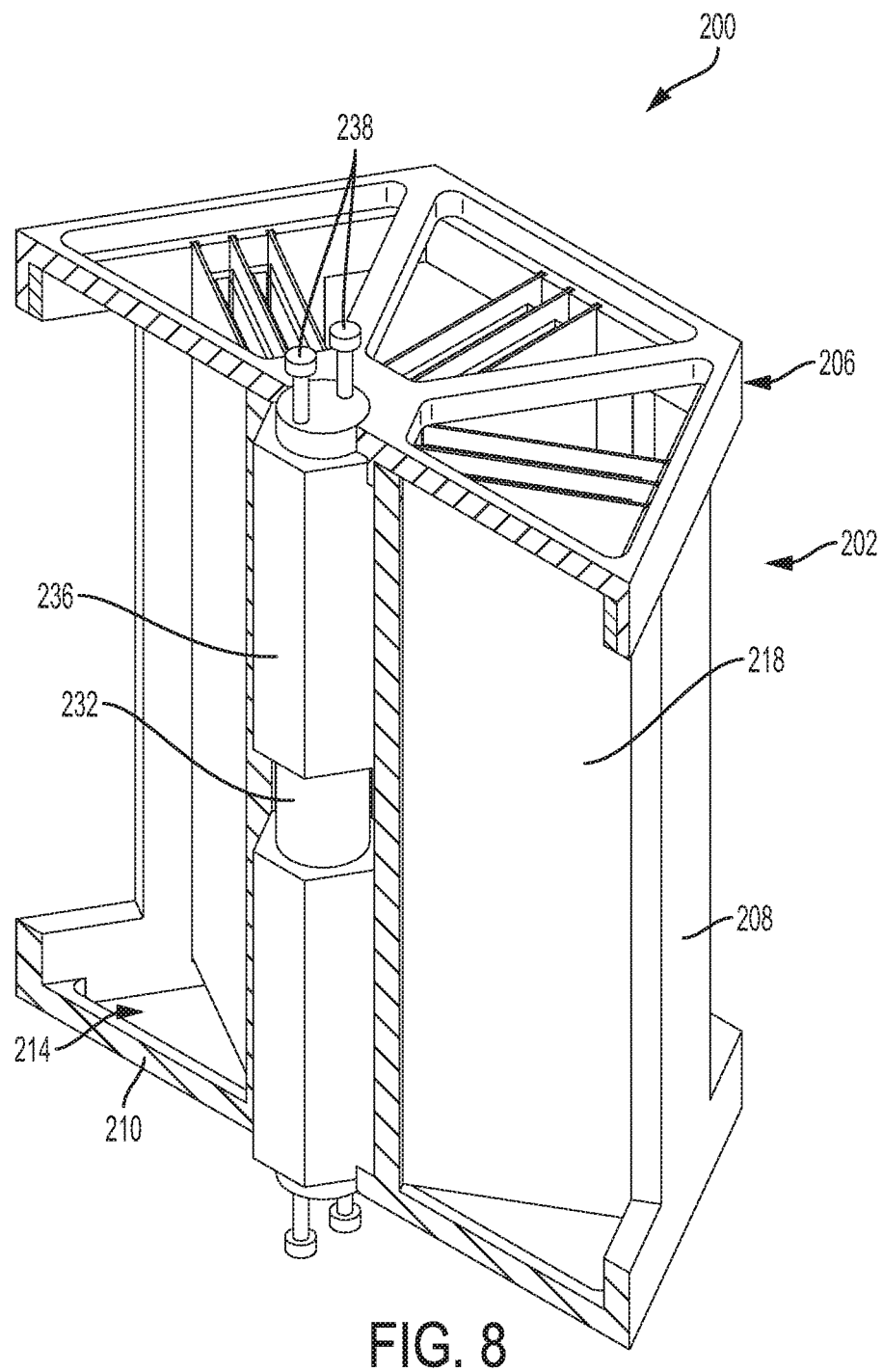
FIG. 8 is a partial cutaway perspective view of the hydrogen storage assembly of FIG. 7.

Referring to FIGS. 7 and 8, an example of a second hydrogen storage assembly is shown generally at reference numeral 200. In the example illustrated, the assembly 200 includes a housing 202 having a main body 204 and an upper end cap 206.

In the example illustrated, the main body 204 includes side walls 208 and a bottom wall 210. The main body 204 is shown to include passages 212 between the side walls 208 and passages 214 between the bottom wall 210, and the end cap 206 is shown to include passages 216. The passages 212, 214, 216 can permit a carrier fluid to flow in to and out from the assembly 200.

Figure 9:
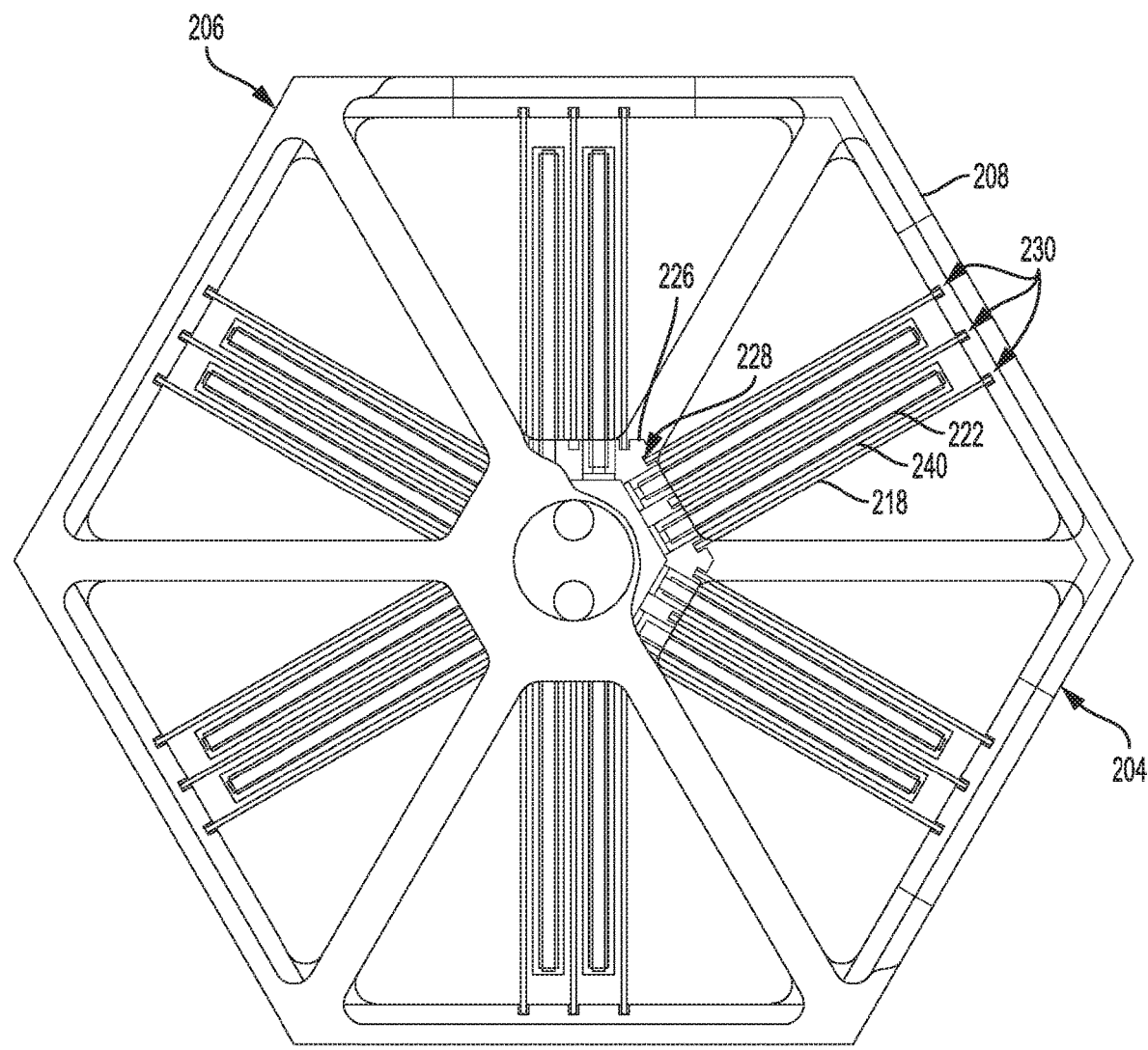
FIG. 9 is a partial cutaway top view of the hydrogen storage assembly of FIG. 7.
Figure 10:
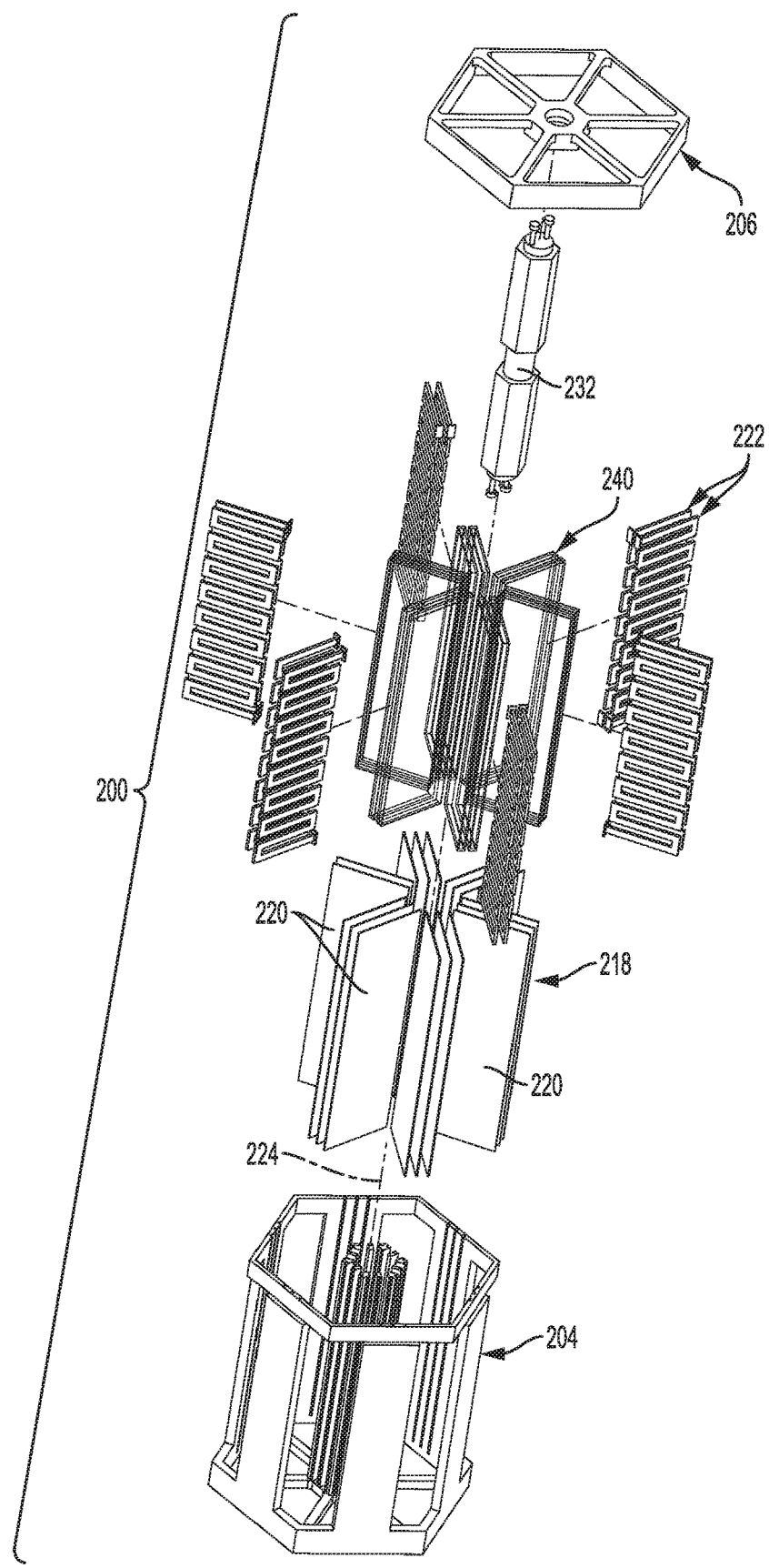
FIG. 10 is an exploded view of the hydrogen storage assembly of FIG. 7.

Referring to FIGS. 9 and 10, the assembly 200 includes wafers 218 that are formed of a substrate material that produces metal hydride when exposed to a hydrogen-rich carrier fluid. The wafers 218 are supported by the housing 202 and arranged so that the carrier fluid can flow over a reaction surface 220 of the wafers 218. In some examples, the metal hydride producing substrate material can be a magnesium-based alloy. Other metal hydride producing materials are possible.

In some examples, the wafers 218 can include a de-activation material on the reaction surface 220. The de-activation material can inhibit formation of surface oxide that can impede hydrogen absorption during charging and hydrogen desorption during discharging, which can be referred to as a "poisoning" effect that can occur during repeated use of the wafers 218. In some examples, the de-activation material can be a layer of nickel deposited on the reaction surface 220. The layer of nickel can be electrodeposited and have a thickness of between 0.5 and 1.5 µm, or about 1 µm. The layer of nickel can have a smooth surface finish, e.g., a surface roughness of about 1 µm $R_a$ or less.

In the example illustrated, the assembly 200 includes heating elements 222 supported by the housing 202. The heating elements 222 are arranged to transfer heat to the wafers 218 to attain an operating temperature suitable for hydrogen charging on the reaction surfaces 220. In some examples, the operating temperature can be between about 200 and 250° C.

In the example illustrated, there are six sets of three parallel wafers 218 in a hexagonal array, held in the housing 202 that is shaped generally as a hexagonal prism. As illustrated, each of the wafers 218 can be a flat plate that is thin-walled, monolithic or solid, rectangular in shape, and spaced apart about a central axis 224 of the assembly 200. In some examples, the wafers 218 can have dimensions of about 75×20×0.5 mm (length, width, thickness, respectively). Other configurations and dimensions are possible.

In the example illustrated, the wafers 218 each of the wafers 218 is suspended generally radially about the central axis 224 between inner supports 226 and outer supports, which in the example illustrated are formed by the side walls 208. Each of the wafers 218 are shown having an inner edge received in an outwardly facing groove 228 of the respective inner support 226, and an outer edge received in an inwardly facing groove 230 of the respective side wall 208.

Referring again to FIG. 8, the assembly 200 includes a central electrical busbar 232 supported by the housing and positioned generally along the central axis 224 (FIG. 9). In the example illustrated, the busbar 232 is shown to include outward faces 236. Electrical power can be provided to the busbar 232 via at least one set of terminals 238.

Referring to FIGS. 8, 9 and 10, the heating elements 222 are connected to and spaced about the busbar 232. In the example illustrated, there are a total of eighteen of the wafers 218 and twelve of the heating elements 222. Each of the heating elements 222 is shown received in a respective sleeve 240 and positioned between the reaction surfaces 220 of adjacent ones of the wafers 218 to heat the wafers 218 by thermal radiation. The sleeves 240 can serve to keep the heating elements 222 from contacting the wafers 218. The sleeves 240 can be made of glass or another transparent or translucent material to allow transmission of radiant heat to the wafers 218. As shown, the reaction surfaces 220 of adjacent pairs of the wafers 218 can be generally parallel to one another, and the heating element 222 can be approximately equidistant to both of the reaction surfaces 220, which can promote uniform heating of the wafers 218.

In the example illustrated, each of the heating elements 222 can take the form of a flat ribbon with a serpentine shape for increasing its electrical resistance and increasing surface area for radiation to the reaction surfaces 220. In the example illustrated, each of the heating elements 222 includes connector mounts at its ends, and the mounts mate with the outward faces 236 of the busbar 232 to establish an electrical connection therewith.

In the example illustrated, the sleeves 240 have inward edges that are received in a slot in the respective inner support 226. In the example illustrated, outward edges of the sleeves 240 are spaced apart from the side wall 208.

Figure 11:
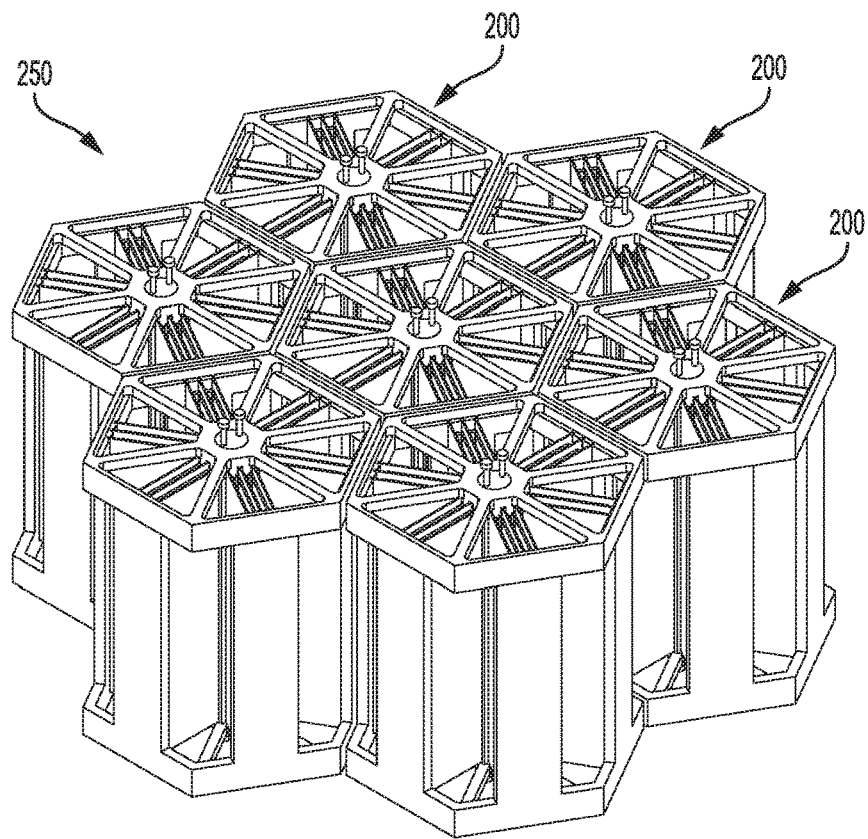
FIG. 11 is a perspective view of a plurality of the hydrogen storage assembly of FIG. 7 arranged in a system.
Figure 12:
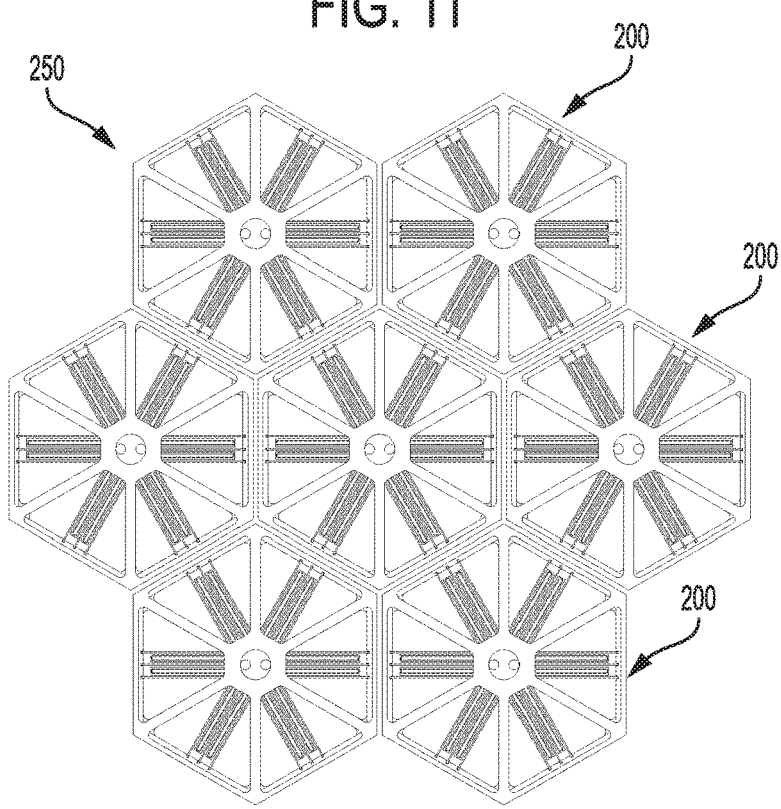
FIG. 12 is a top view of the storage system of FIG. 11.

Referring to FIGS. 11 and 12, several of the assembly 200 can be arranged together to create a hydrogen storage system 250. The housing of the assembly 200 defines at top profile that is generally hexagonal in shape, thereby enabling a relatively close-packed arrangement.

Figure 13:
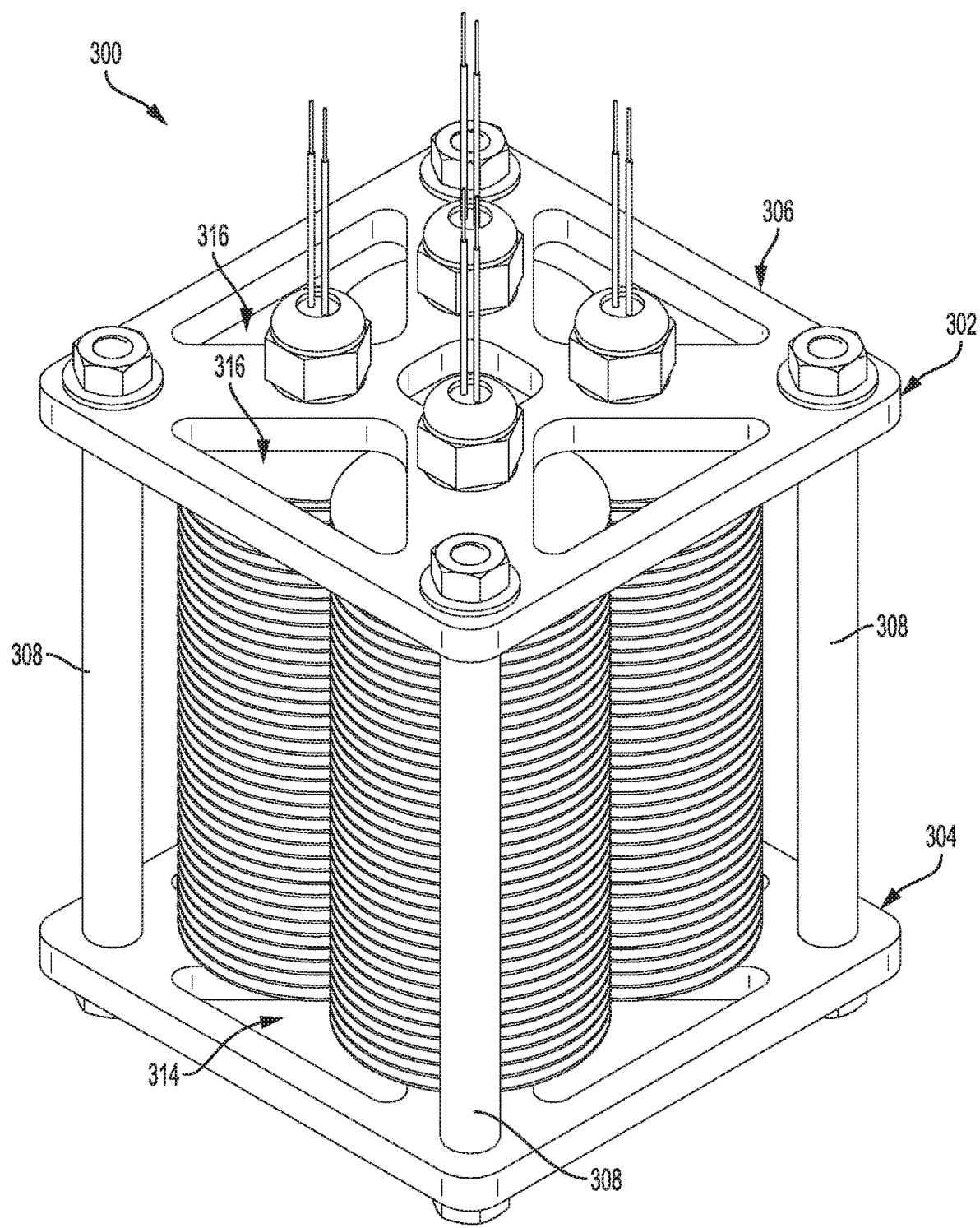
FIG. 13 is a perspective view of a hydrogen storage assembly in accordance with a third example.
Figure 14:
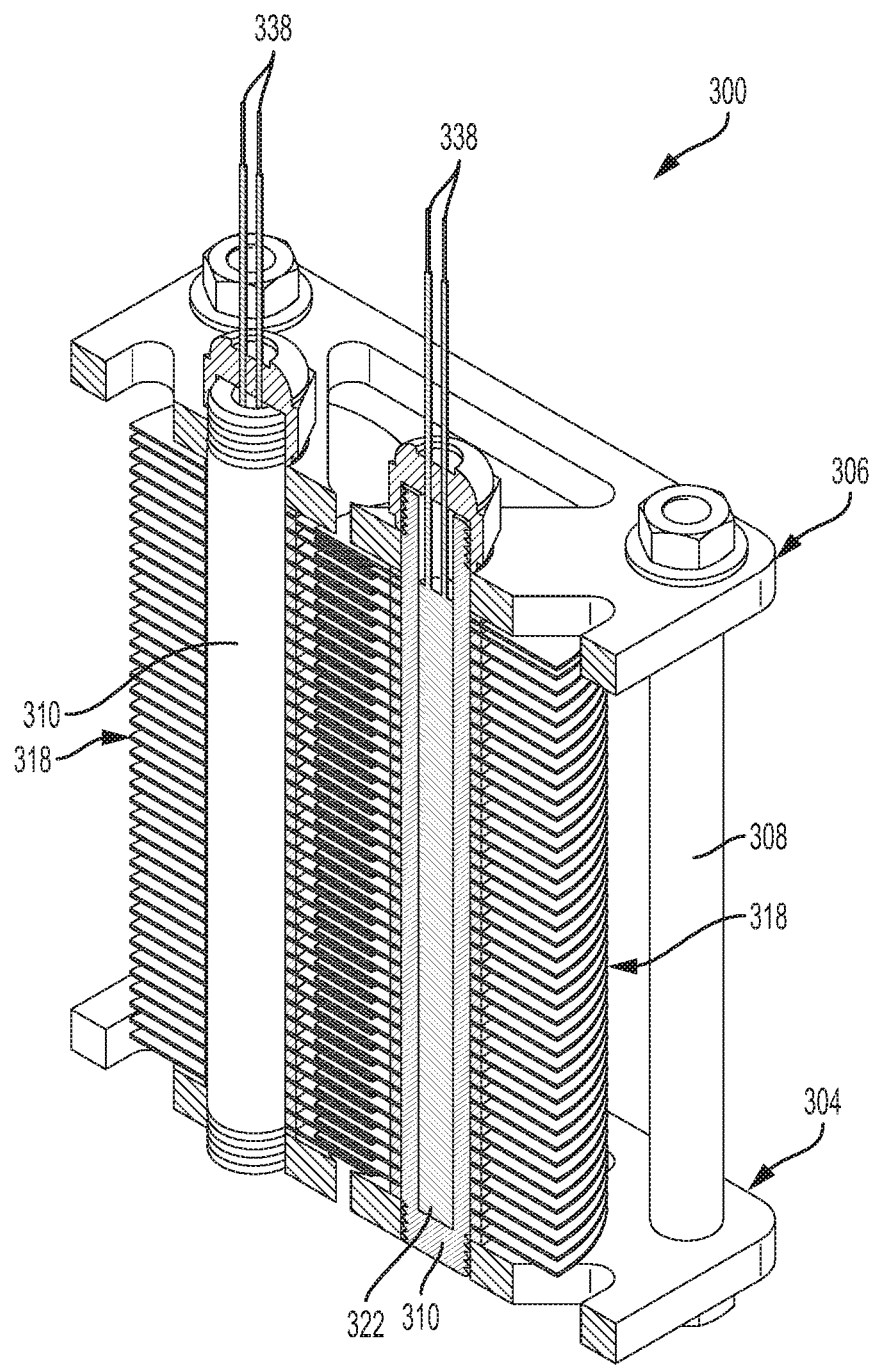
FIG. 14 is a partial cutaway perspective view of the hydrogen storage assembly of FIG. 13.

Referring to FIGS. 13 and 14, an example of a third hydrogen storage assembly is shown generally at reference numeral 300. In the example illustrated, the assembly 300 includes a housing 302 having a first end panel 304 and a second end panel 306 spaced apart from the first end panel 304.

In the example illustrated, the housing 302 includes support rods 308 and stems 310 extending between and connecting the end panels 304, 306. The end panels 304, 306 are shown to include passages 314, 316, respectively. The passages 314, 316 and spacing around the support rods 308 can permit a carrier fluid to flow in to and out from the assembly 300.

Figure 15:
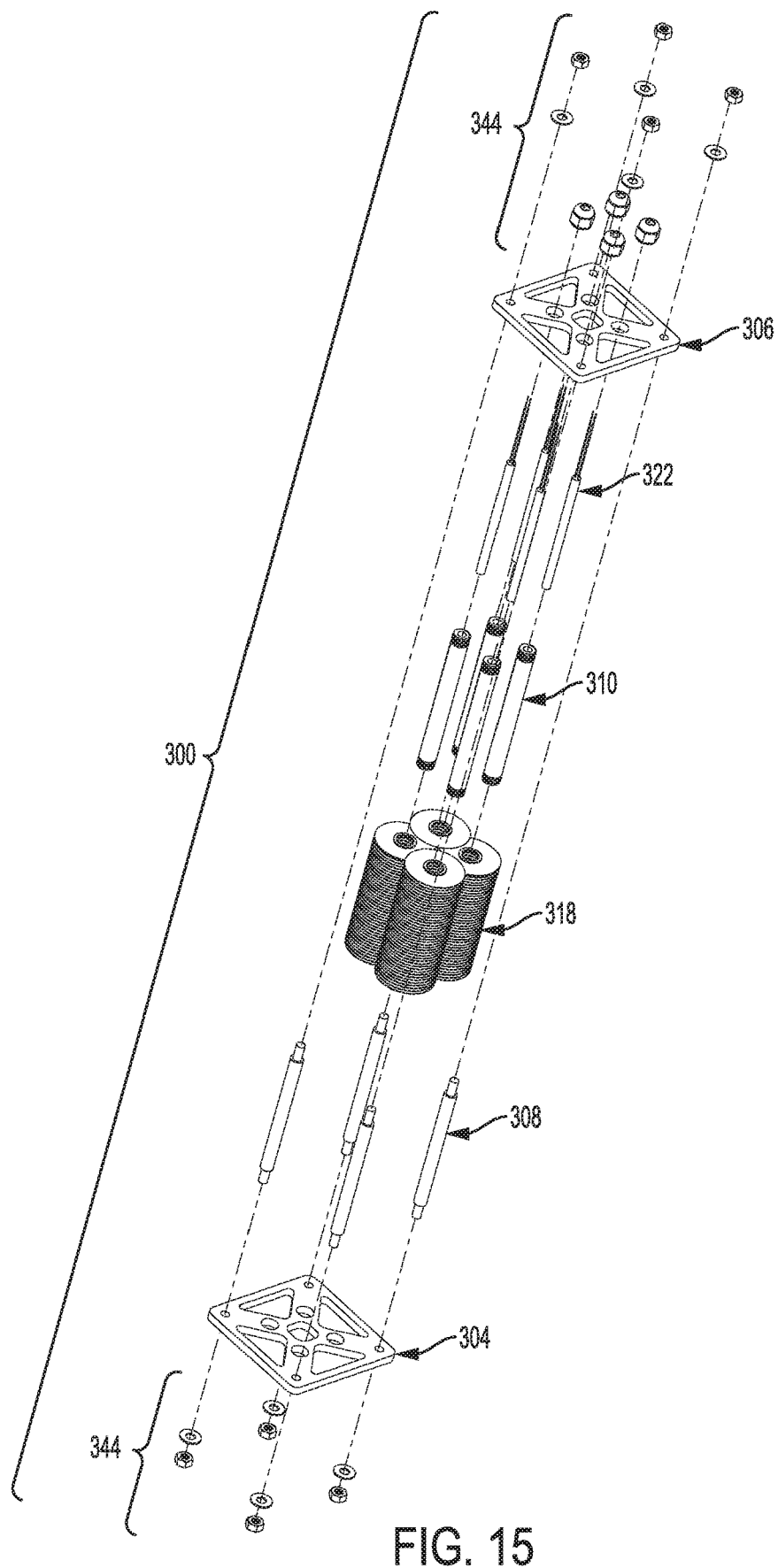
FIG. 15 is an exploded view of the hydrogen storage assembly of FIG. 13.

Referring to FIGS. 14 and 15, the assembly 300 includes wafers 318 that are formed of a substrate material that produces metal hydride when exposed to a hydrogen-rich carrier fluid. The wafers 318 are supported by the housing 302 and arranged so that the carrier fluid can flow over a reaction surface of the wafers 318. In some examples, the metal hydride producing substrate material can be a magnesium-based alloy. Other metal hydride producing materials are possible.

In some examples, the wafers 318 can include a de-activation material on the reaction surface. The de-activation material can inhibit formation of surface oxide that can impede hydrogen absorption during charging and hydrogen desorption during discharging, which can be referred to as a "poisoning" effect that can occur during repeated use of the wafers 318. In some examples, the de-activation material can be a layer of nickel deposited on the reaction surface. The layer of nickel can be electrodeposited and have a thickness of between 0.5 and 1.5 µm, or about 1 µm. The layer of nickel can have a smooth surface finish, e.g., a surface roughness of about 1 µm $R_a$ or less.

In the example illustrated, the assembly 300 includes heating elements 322 supported by the housing 302. The heating elements 322 are arranged to transfer heat to the wafers 318 to attain an operating temperature suitable for hydrogen charging on the reaction surfaces. In some examples, the operating temperature can be between about 200 and 250° C.

In the example illustrated, there are four sets of the wafers 318 in a stacked arrangement in a square array, held in the housing 302 that is shaped generally as a cuboid. As illustrated, each of the wafers 318 can be a flat disc that is thin-walled, monolithic or solid, and annular in shape. In some examples, the wafers 318 can have dimensions of about 12.5×45×0.5 mm (inside diameter, outside diameter, thickness, respectively). Other configurations and dimensions are possible.

In the example illustrated, each of the wafers 318 includes a central hole, and a respective one of the stems 310 extends through the central hole. Hardware 344 applied to the support rods 308 and the stems 310 can exert a clamping force to clamp the wafers 318 between the end panels 304, 306. The number of the wafers 318 stacked between the end panels 304, 306 can be varied to vary the overall size of the assembly 300.

In the example illustrated, the heating elements 322 are received within a central bore of each of the stems 310 to heat the wafers 318 by thermal conduction. Each of the heating elements 322 can take the form of a hermetically-sealed cartridge heater, and electrical power can be provided to the heating elements 322 via terminals 338.

In the example illustrated, the wafers 318 are provided in four stacked arrangements, and contact between them can permit thermal conduction between all of the stacks. In the example illustrated, the wafers 318 of one stack partially overlap the wafers 318 of two adjacent stacks, in an alternating or staggered relationship with each, but does not overlap the wafers 318 of the stack that is diagonally opposite and of mirrored formation. With two of the stacks staggered relative to the other two stacks of the wafers 318, the utilization of space can be enhanced so as to reduce the overall dimensions of the assembly 300.

Figure 16:
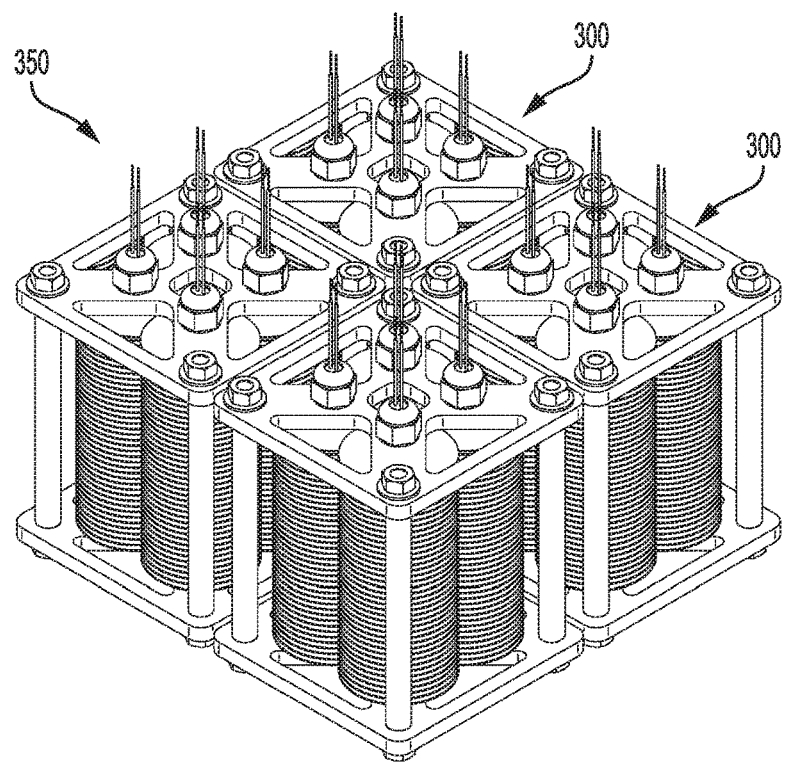
FIG. 16 is a perspective view of a plurality of the hydrogen storage assembly of FIG. 13 arranged in a system.
Figure 17:
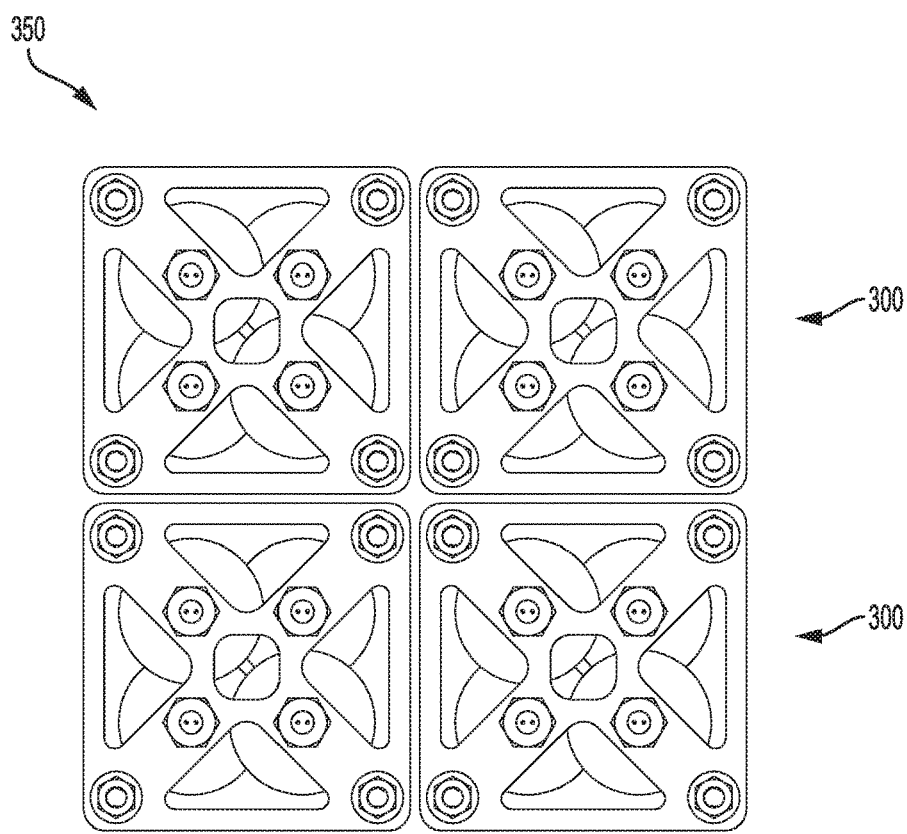
FIG. 17 is a top view of the storage system of FIG. 16.

Referring to FIGS. 16 and 17, several of the assembly 300 can be arranged together to create a hydrogen storage system 350. The housing of the assembly 300 defines at top profile that is generally square or rectangular in shape, thereby enabling a relatively close-packed arrangement.

To prepare the wafers 118, 218, 318, a plate or a disc of the metal hydride producing substrate material (e.g., a magnesium-based alloy) can be provided, and the de-activation material (e.g. a layer of nickel) can be electrodeposited onto the plate/disc. Prior to electrodeposition, outer surfaces of the plate/disc can be prepared, including, for example, acetone-cleaning by ultrasonic techniques, and then kept immersed in distilled water at room temperature. Suitable electrolyte and plating parameters can be selected to electrodeposit, for example, the layer of nickel to a thickness of between 0.5 and 1.5 µm, or about 1 µm, and with a surface roughness of about 1 µm $R_a$ or less. In some examples, a nickel sulfamate plating solution can be used with electroplating conditions of about 40 to 60° C. solution temperature, a current density of about 2 to 25 A/dm$^2$ and a pH of about 3.5 to 4.5.

The hydrogen storage assemblies 100, 200, 300 can be used for storing hydrogen gas for use in transportation or other commercial applications. The hydrogen storage assemblies 100, 200, 300 can be used potentially for indoor vehicles as fuel or in confined spaces where insufficient air may pose a problem.

In use, heat can be transferred to the wafers 118, 218, 318 to attain an operating temperature suitable for hydrogen charging on the reaction surfaces 120, 220, 320, which can be a moderate or low temperature of about 250° C. or less. A hydrogen-rich carrier fluid can be flowed over the wafers 118, 218, 318 so as to charge hydrogen on the reaction surfaces 120, 220, 320 and thereby store hydrogen. In some examples, the hydrogen-rich carrier fluid can have more than 80% hydrogen gas mixed with an inert gas (e.g., argon or helium). The carrier fluid can be delivered to the wafers 118, 218, 318 at a relatively low exposure pressure of about 10 Torr or less. A second carrier fluid can be flowed over the wafers 118, 218, 318 to discharge hydrogen from the reaction surfaces 120, 220, 320 and thereby release hydrogen. In some examples, the second carrier fluid that gathers the hydrogen being discharged can be an inert gas.

While the above description provides examples of one or more apparatuses or methods, it will be appreciated that other apparatuses or methods may be within the scope of the accompanying claims.

We claim:

1. A hydrogen storage assembly, comprising:
   a housing;
   a central electrical busbar supported by the housing and positioned generally along a central axis of the assembly;
   at least one wafer formed of a substrate material that produces metal hydride when exposed to a hydrogen-rich carrier fluid, the at least one wafer supported by the housing and arranged so that the hydrogen-rich carrier fluid can flow over a reaction surface of the at least one wafer; and
   at least one heating element arranged to transfer heat to the at least one wafer to attain an operating temperature suitable for hydrogen charging on the reaction surface, the at least one heating element comprising a plurality of electrical heating elements connected to and spaced about the central electrical busbar.

2. The hydrogen storage assembly of claim 1, wherein the at least one wafer comprises a plurality of monolithic plate wafers spaced apart about the central axis.

3. The hydrogen storage assembly of claim 2, wherein each of the electrical heating elements is received in a respective sleeve and positioned between the reaction surfaces of adjacent ones of the plate wafers to heat the plate wafers by thermal radiation.

4. The hydrogen storage assembly of claim 3, wherein each of the electrical heating elements is generally equidistant between the reaction surfaces of the adjacent ones of the plate wafers.

5. The hydrogen storage assembly of claim 2, comprising a de-activation material on the reaction surface for inhibiting formation of surface oxide that impedes hydrogen absorption during charging and hydrogen desorption during discharging.

6. The hydrogen storage assembly of claim 5, wherein the substrate material is a magnesium-based alloy, and the de-activation material is a layer of nickel deposited on the reaction surface.

7. The hydrogen storage assembly of claim 6, wherein the layer of nickel has a thickness of between 0.5 and 1.5 µm.

8. The hydrogen storage assembly of claim 6, wherein the layer of nickel has a surface roughness of about 1 µm Ra or less.

9. The hydrogen storage assembly of claim 2, wherein each of the plate wafers is suspended generally radially between respective inner and outer supports of the housing.

10. The hydrogen storage assembly of claim 9, wherein opposing edges of each of the plate wafers is received in an outwardly facing groove of the respective inner support and an inwardly facing groove of the respective outer support.

11. The hydrogen storage assembly of claim 2, wherein the housing comprises at least one sidewall and at least one end cap, each having passages permitting flow of the hydrogen-rich carrier fluid over the plate wafers.

12. The hydrogen storage assembly of claim 11, wherein the at least one sidewall and at least one end cap define a top profile of the hydrogen storage assembly that is generally round or hexagonal in shape.

13. A method of storing hydrogen, comprising:
   providing a hydrogen storage assembly comprising a plurality of wafers formed of a substrate material that produces metal hydride when exposed to a hydrogen-rich carrier fluid, the plurality of wafers each comprising a reaction surface and a de-activation material on the reaction surface;
   transferring heat to the plurality of wafers to attain an operating temperature suitable for hydrogen charging on the reaction surfaces;
   flowing the hydrogen-rich carrier fluid over the plurality of wafers so as to charge hydrogen on the reaction surfaces, thereby storing hydrogen in the hydrogen storage assembly; and
   maintaining the operating temperature at about 250° C. or less.

14. The method of claim 13, wherein the step of flowing comprises delivering the hydrogen-rich carrier fluid to the at least one wafer at an exposure pressure of about 10 Torr or less.

15. The method of claim 13, comprising, after the step of flowing, flowing a second carrier fluid over the plurality of wafers to discharge hydrogen from the reaction surfaces, thereby releasing hydrogen from the hydrogen storage assembly.

16. The method of claim 13, wherein the step of heating comprises heating the plurality of wafers with at least one electrical heating element.

17. The method of claim 16, wherein the step of heating comprises heating the plurality of wafers by thermal radiation.

18. The method of claim 17, wherein the plurality of wafers comprises a plurality of monolithic plate wafers, and further comprising arranging the at least one electrical heating element between adjacent ones of the plate wafers.

19. The method of claim 16, wherein the step of heating comprises heating the plurality of wafers by thermal conduction.

20. The method of claim 19, wherein the plurality of wafers comprises a plurality of monolithic disc wafers in at least one stacked arrangement, each of the disc wafers comprising a central hole, and further comprising arranging the at least one electrical heating element extending through the central holes of at least a portion of the disc wafers.

21. The method of claim 13, wherein the de-activation material on the reaction surfaces inhibits formation of surface oxide that impedes hydrogen absorption during charging and hydrogen desorption during discharging.

22. The method of claim 21, wherein the substrate material is a magnesium-based alloy, and the de-activation material is a layer of nickel deposited on the reaction surfaces.

\* \* \* \* \*